United States Patent [19]

Carrier et al.

[11] Patent Number: 4,972,673
[45] Date of Patent: Nov. 27, 1990

[54] SOLID ROCKET MOTOR WITH DUAL INTERRUPTED THRUST

[75] Inventors: Joseph L. C. Carrier, Ste-Foy; Tryfon Constantinou, Sillery; Charles J. Shea; Donald L. Smith, both of Ste-Foy, all of Canada

[73] Assignee: Her Majesty the Queen as represented by the Minister of National Defence of Her Majesty's Canadian Government, Canada

[21] Appl. No.: 713,640

[22] Filed: Mar. 19, 1985

[30] Foreign Application Priority Data

Oct. 29, 1984 [CA] Canada .................................. 466549

[51] Int. Cl.⁵ .............................................. F02K 9/00
[52] U.S. Cl. ...................................... 60/245; 60/250; 60/253
[58] Field of Search .................. 60/253, 254, 256, 271, 60/241, 245, 250; 102/374, 380, 381

[56] References Cited

U.S. PATENT DOCUMENTS

| 2,856,851 | 10/1958 | Thomas | 60/253 |
| 2,952,972 | 9/1960 | Kimmel et al. | 60/271 |
| 3,173,249 | 3/1965 | Wiggins | 60/253 |
| 4,085,584 | 4/1978 | Jones et al. | 60/256 |

FOREIGN PATENT DOCUMENTS

| 1116988 | 5/1956 | France | 60/253 |
| 530499 | 12/1957 | Italy | 102/380 |

Primary Examiner—Louis J. Casaregola
Assistant Examiner—T. Thorpe
Attorney, Agent, or Firm—Stevens, Davis, Miller & Mosher

[57] ABSTRACT

The invention disclosed is a solid propellant rocket motor, capable of providing two separate propulsive impulses to a missile. The rocket motor is connected at one end to the missile body, the other end including an exhaust nozzle. The rocket motor comprises two stages connected by an interstage bulkhead. The bulkhead includes a port opening which is closed by a frangible cover which prevents the second stage from igniting during burning of the first stage, but breaks up into harmless fragments during firing of the second stage.

10 Claims, 2 Drawing Sheets

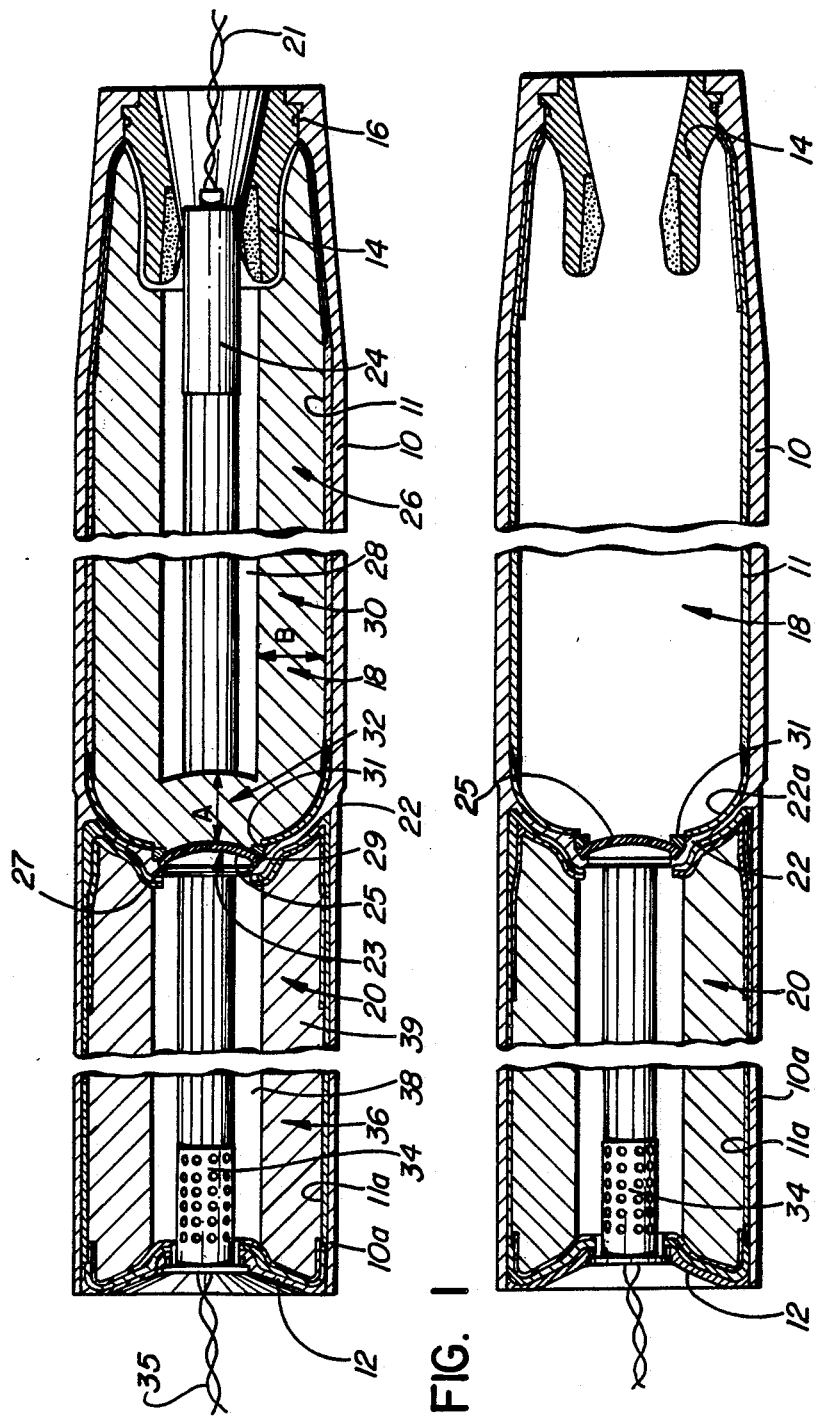

SOLID ROCKET MOTOR WITH DUAL INTERRUPTED THRUST

The present invention relates to rocket motors and in particular to solid propellant rocket motors capable of providing multiple propulsive impulses to a missile (guided or unguided) such as a rocket vehicle.

The problem addressed by the subject invention is to design an efficient and economical propulsion system for a missile using a solid propellant rocket motor capable of imparting two separate propulsive impulses to the missile. The requirement for two separate propulsive impulses (or dual interrupted thrust as it will be henceforth designated) stems from the improvements that can accrue to a rocket-powered missile's kinematic performance (velocity-time history) by being able to apply a second propulsive impulse at a particular time during flight.

One case which would benefit from dual interrupted thrust would be that of an anti-aircraft missile. The second impulse would be applied just prior to the missile intercepting the target. The extra velocity thus imparted would increase missile's maneuverability thus enhancing its kill probability. A second case which would benefit from the use of a second propulsive impulse would be for a missile which must be effective at both long and short ranges. In the short range case, the second impulse would be fired immediately after the end of burn of the first impulse, thus maximizing the missile's velocity over the short flight distance. For the same missile in the long range case, the timing of firing of the second impulse would be selected based on the requirement to minimize the peak velocity and hence reduce drag (drag being a function of the velocity squared). A third case for a dual interrupted thrust motor would be for a missile which has a restricted maximum velocity or Mach number (because of structural or thermal limits) but requires a large amount of total impulse to reach a specified range. If all the impulse were applied at the beginning of the flight, the upper velocity limit would be exceeded. However by applying a fraction of the impulse at the beginning, then letting the missile coast and decelerate (due to drag), then applying the second impulse, both range and velocity requirements can be respected.

There are a number of methods currently used to apply two separate propulsive impulses to missiles using solid propellant rocket motors.

Jettisonable First Stage

This is undoubtedly the most common method of providing dual (or multiple) impulses to a rocket powered missile. The propulsion unit consists of two (or more) independent rocket motors connected or attached by quick-release latches or explosive bolts. After the first stage has finished burning, the latches or explosives bolts are activated and the first stage is jettisoned. The second (or subsequent) stage can then be ignited whenever necessary.

There are four major drawbacks to the jettisonable first stage propulsion system. First, when the first stage is jettisoned, the external shape of the missile changes, which can cause aerodynamic instability and control problems. Second, aft-end or tail control surfaces cannot readily be used on such a missile because they would be lost when the first stage is jettisoned. Third, the system cannot be used with short and medium range air-launched missiles because of the danger of collision between the first stage and the launch aircraft. Finally, propulsion systems consisting of two (or more) motors are generally more expensive than those with a single motor because of the increased number of components and assembly operations.

Dual Chamber, Multiple Nozzle, Transfer Tube

The single motor has two separate combustion chambers, each having its own external nozzle or nozzles at the rear of the motor. The exhaust gases from the second (or forward) chamber are ducted through the aft chamber by means of an insulated transfer tube. The charges in each chamber can be burned sequentially or simultaneously.

There are three major drawbacks to this concept. The first is that the weight of and volume occupied by the transfer tube reduce the amount of propellant which can be carried in a given size of motor. The second drawback is that the multiplicity of nozzles at the aft-end of the motor reduces the expansion ratio (the ratio of nozzle exit area to throat area) available to either stage. Since the specific impulse of the motor is generally proportional to the expansion ratio, the motor's performance is reduced. Finally, the multiplicity of nozzles increases the number of components and hence the cost of the motor.

Dual Chamber, Single External Nozzle, Sonic Interstage Nozzle

The single motor has two separate combustion chambers separated by an interstage bulkhead which has small sonic orifice or nozzle. During the operation of the first (aft) stage, the interstage nozzle is blocked by a plug. At the desired time after the end of the first stage burn, the second stage igniter is fired. This blows out the plug and lights up the second stage propellant. Because the plug must pass freely through the external nozzle, the diameter of the plug, and hence the diameter of the orifice in the interstage bulkhead must be less than the throat diameter of the external nozzle.

The major drawback of this concept results from the requirement that the throat in the interstage bulkhead must be smaller than the throat of the external nozzle. This causes the gases from the second stage to expand supersonically into the empty first stage chamber. Prior to passing through the throat of the external nozzle, the gas velocity must be reduced to subsonic, which requires the formation of shock waves. Since the shock process is irreversible and nonisentropic, the gases lose energy which reduces the performance of the motor.

Single Chamber, Insulated Radial Burning Second Stage

The motor has a single combustion chamber with two separate, radial burning propellant charges. The exposed, internal surfaces of the second, forward grain are covered by an envelope made of a rubbery material which insulates the second stage grain from the high temperature combustion gases produced during the first stage burn. The insulating envelope is bonded to the combustion chamber liner at the aft end of the second stage grain; it is not bonded to the grain itself. The second stage igniter is placed behind, or under the insulating envelope. When the second stage igniter is fired, it strips the insulating envelope off the propellant surface, ejects the envelope through the nozzle, and ignites the second stage propellant.

There are three drawbacks to this concept. The first results from the fact that both charges are contained in a single chamber. If it is desirable that the first stage operate at high pressure, while the second operates at a medium or low pressure (as is often the case in boost-sustain applications) the entire chamber must be designed for the high pressure phase (i.e. thick, heavy chamber walls). Conversely, for a motor with dual chambers, the first stage chamber can be designed for high pressure, while the second chamber can be designed for low pressure operation, therefore reducing the weight of the complete chamber, thus improving the motor's performance.

The second drawback of the insulated charge concept is the potential for unreliable operation caused by a failure of the insulating envelope. Any hole or fissure in the envelope could result in the inadvertent and catastrophic ignition of the second stage charge while the first stage is still burning. The potential for such a failure is high because of the impossibility of testing the pressure tightness of the envelope in-situ.

A particularly susceptible point in the design is the joint between the first stage's sidewall liner and the insulating envelope. This joint must be made adequately robust to prevent any gas leakage during first stage operation, yet sufficiently weak, to tear away from the sidewall liner without damaging it when the second stage is ignited. Such contradictory requirements decrease the reliability of the system.

A final problem with the insulated charge arises in the case of an air-launched missile. Because of its size, the insulating envelope could endanger the launch aircraft, should it ingest the liner into its engine after the liner is ejected from the rocket motor.

Single Chamber, Insulated End Burning Second Stage

This motor is very similar to the insulated radial burner except that the second stage grain is an end or cigarette burning charge and the insulating envelope is simply a disc of rubbery material placed over the aft end of the grain and bonded to the sidewall liner. The igniter is sandwiched between the end of the grain and the insulating disc.

Because of their similarities, the insulated end burning second stage design possesses the same disadvantages as the insulated radial burner, except that, since the area of the insulator is substantially reduced, the problems of reliability and aircraft damage will be similarly reduced. However, being an end burner, the motor is capable of operation only over a limited range of conditions (pressure and thrust), compared to a radially burning charge. Consequently, the insulated end burning second stage can only be used in a limited number of applications.

It is an object of this invention to provide a solid propellant rocket motor which will provide dual interrupted propulsion thrust or impulse to a missile without the disadvantages of the various concepts discussed above.

According to the invention, a solid propellant rocket motor which is capable of providing two separate propulsive impulses to a missile is provided, comprising:

a cylindrical open-ended casing, one end of which is to be connected to the missile, the other end including an exhaust nozzle having a single centrally located opening;

a first stage combustion chamber adjacent the aft-end of said casing;

a first stage igniter and solid propellant composition disposed in said first stage combustion chamber;

a second stage combustion chamber adjacent the fore-end of said casing;

a second stage igniter and solid propellant composition disposed in said second stage combustion chamber;

interstage bulkhead means separating said first and second combustion chambers;

central port means provided in said bulkhead to connect said first and second combustion chambers; and port closure means, wherein the area of the port opening is greater than the smallest area of the nozzle opening to ensure sub-sonic flow of combustion gases from said second combustion chamber, and wherein said port closure means is shaped to withstand combustion pressures applied forwardly during firing of the first stage, and is made of a suitable frangible material which will break up into harmless fragments under combustion pressures exerted rearwardly during firing of the second stage.

In the drawing which serves to describe the preferred embodiments of the invention:

FIG. 1 is a side elevation in section of a rocket motor according to the present invention in initial, unfired condition;

FIG. 2 is a side elevation in section of a rocket motor according to the present invention after completion of the first stage burn.

Figure 3:
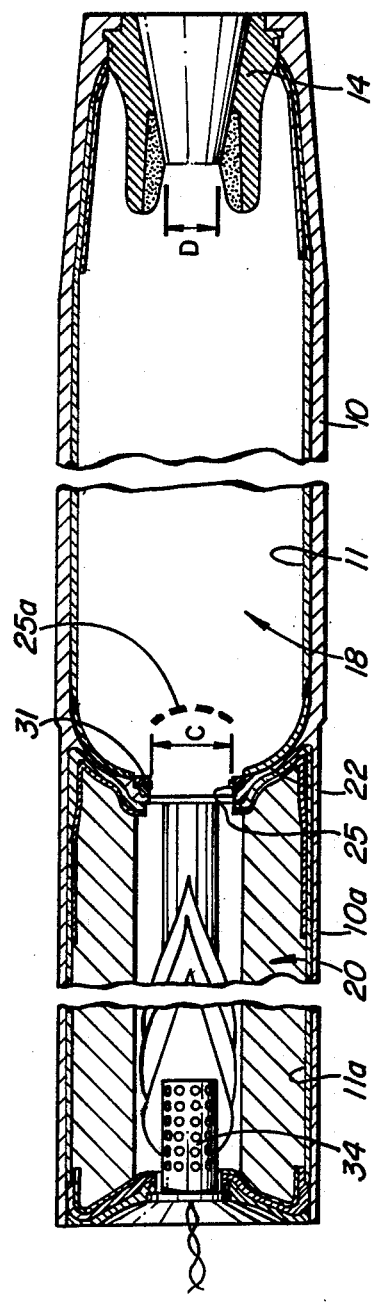
FIG. 3 is a side elevation in section of a rocket motor of the present invention during ignition of the second stage, illustrating fragmentation of the interstage port closure.

Referring to the drawing, the rocket motor is seen to comprise a cylindrical open-ended casing 10 of a suitable metal or composite material. The internal surfaces of the casing 10 are lined with a suitable insulant 11 to protect the casing from combustion gases. Suitable insulants include the composite sheet insulant described in applicant's U.S. Pat. No. 4,148,675 of Apr. 10, 1979. The fore-end of the motor casing is to be connected to a missile body such as a rocket vehicle (not shown) and is closed by a removable closure plate 12 which is typically threaded into the casing 10. A conical exhaust nozzle 14 having a single centrally located opening is secured to the aft-end of the casing 10 by any conventional means such as a lockwire 16. A conical nozzle shape is inessential.

The rocket motor further comprises a first stage combustion chamber 18 adjacent the aft-end of the casing and a second stage combustion chamber 20 adjacent the fore-end of the casing. An interstage bulkhead means 22 separates the first and second chambers 18 and 20. The bulkhead 22 is integral with the casing 10. It is not essential that the bulkhead is integral with the casing, although it is desirable from a cost and weight standpoint. A central port means 23 is provided in the bulkhead 22 to connect the first and second chambers 18 and 20. A port closure means 25 is also provided.

The port closure means 25 is adhesively bonded to the bulkhead 22 and is shaped to withstand combustion pressures applied forwardly during firing of the first stage, and is made of a suitable frangible material which will break up into harmless fragments under combustion pressures exerted rearwardly during firing of the second stage.

To accomplish this, the port closure is manufactured from a frangible material having a high ratio of compressive to tensile strengths. Furthermore, the geometry of the closure is such that it is loaded only in compression by forwardly directed pressure in the first stage chamber and in tension by the rearwardly directed pressure in the second stage chamber. This permits the motor to be designed with a port area in the interstage bulkhead substantially greater than the nozzle throat diameter. Thus, during second stage operation, the gas flow through the interstage bulkhead opening is subsonic so that there is no loss of energy caused by shocking or compression of the combustion gas. Also, because the port closure shatters into many small fragments, there is very little hazard for the launching aircraft when the motor is used in an air launched missile. This concept permits load and pressure testing of the entire assembly thus improving the reliability of the motor.

More specifically, the closure 25 is dome-shaped, with a convex surface facing the first chamber 18 and a concave surface facing the second chamber 20. This ensures that, when pressure is applied forwardly from the first chamber against the convex surface, the stresses are compressive throughout the dome.

The properties required for the port closure are relatively low tensile strength, high compressive strength and frangibility. Ceramics are generally suitable materials. However, many engineering ceramics, as opposed to pottery-type ceramics, cast-iron, tempered glass and graphite are also contemplated. What is important is that the material must have the property of frangibility (shatter upon impact), a good balance of mechanical and thermal properties, and a compressive-to-tensile strength ratio significantly larger than 1.0 (preferably around 3.0).

Most engineering ceramic parts are rather involved in manufacturing. The raw ceramic powder has to be shaped (by pressing, casting or plastic forming), densified (by sintering, hot-pressing or kiln-firing) and the part is finally machined to net shape (usually by grinding). At low production volumes, this is very costly. Fortunately, there is a special class of ceramics that are readily machinable, i.e. the glass-ceramics, such as MACOR (a trade mark of Corning Glass). MACOR is sold in slabs, rods and sheets (like metals) from which any shape can be machined using conventional techniques (turning, milling, drilling). This machinability is what led us to prefer MACOR.

The dimensions of the port closure are selected to support the forwardly directed pressure of the first stage chamber and to leave an opening in the interstage bulkhead substantially bigger than the size of the nozzle throat when the cover is fractured. The actual values of the first and second stage combustion pressures to which the port closure is subjected depend upon the specific application. However, the ratio between the forwardly directed first stage proof pressure and the rearwardly directed second stage rupture pressures can vary from about 2 to 10:1.

The bulkhead 22 includes a groove 27 which provides a bearing surface for receiving an annular nub 29 about the periphery of the closure 25, such that when combustion pressure is applied forwardly, the closure 25 is in compression. A steel locking ring 31 is provided in the first chamber between the closure 25 and the motor casing 10 to prevent the closure 25 from blowing off when combustion pressure is applied rearwardly from the second chamber 20. The ring 31 is conveniently threaded into the bulkhead 22, thus ensuring that the closure will shatter.

The first combustion chamber 18 includes a pyrotechnic igniter 24 mounted in the throat of the nozzle 14 and is blown out of the exhaust nozzle opening upon ignition of the first stage. The igniter is electrically connected to a firing circuit (not shown) by electrically insulated wires 21. The first combustion chamber also includes a suitable solid propellant grain 26. The propellant grain 26 is typically pour-cast into the chamber 18 and bonded to the insulant lining 11. The propellant grain is of the radial burning type and its initial shape is selected to give the desired type of thrust-time curve. Suitable solid propellants are described in applicant's U.S. Pat. No. 4,427,468 of Jan. 24, 1984. More specifically, the first stage propellant grain 26 includes a central longitudinal perforation 28 from which the radial burning commences and works its way outwardly toward the casing 10. A solid cylindrical propellant web 30 is provided around the circumference of the casing 10. It is noted that the perforation 28 does not extend right up to the bulkhead 22. At this point, a plug 32 of solid propellant is provided adjacent the bulkhead 22. As best seen in FIG. 1, the propellant plug thickness A is approximately equal to the propellant web thickness B. Also, the aft-facing surface 22a of the bulkhead is essentially toroidal in shape. The center of the toroid corresponds to the forward corner of the perforation in the first stage grain. This ensures that the radial burn of the propellant grain results in simultaneous completion throughout the first chamber, i.e. the burning surface of the propellant grain reaches the entire port closure, bulkhead and adjacent casing sidewall surfaces virtually simultaneously. The propellant plug 32 thus serves to protect the closure 25 from the hot combustion gases resulting from the first stage burn and ensures that the closure will not be fractured by differential thermal expansion during the first stage burn.

The second stage combustion chamber 20 includes a pyrotechnic igniter 34. Igniter 34 is conveniently threaded into the fore-end closure plate 12 and remains in place throughout the firing of the second stage. The igniter 34 is conveniently electrically connected to a conventional external firing circuit (not shown) by electrically insulated wires 35. The pyrotechnic charge for igniter 34 is selected to ensure proper fragmentation of closure 25.

The second stage propellant grain 36 is separately pour-cast into the chamber 20 and bonded to the insulant lining 11a which is not as thick as liner 11 in the first chamber. Similarly, the wall thickness of the casing 10a may be thinner in the second chamber. The thicker casing and insulant in the first chamber is to allow for higher pressure operation of the first stage and to accommodate the second stage exhaust which must pass through the first chamber. Depending on the mission of the missile, the second stage may operate at the same or lower pressure than the first stage. In such cases, the wall thickness of the second stage chamber would be the same or thinner, respectively, than that of the first chamber. The propellant grain 36 includes a central longitudinal perforation 38 which extends its entire length, i.e. from the igniter 34 to the bulkhead 22, thus providing direct access for the igniter to the closure 25. The solid portion or web 39 of the propellant grain is preferably of constant thickness to ensure substantially simultaneous completion of the radial burn, although this is inessential.

With specific reference to FIG. 2, it will be noted that the first stage firing has been completed and that the first combustion chamber 18 is empty. The propellant grain has been completely consumed, leaving the port closure 25 intact. The first stage igniter has been ejected.

Turning to FIG. 3, the second stage has been ignited and the frangible port closure 24 has been broken up into fragments 25a by the rearwardly directed combustion pressure exerted by the igniter, leaving a port opening of diameter C which is substantially greater than the diameter D of the nozzle throat to ensure subsonic flow of combustion gases through the port opening and the first combustion chamber.

The motor casing, complete with the integral interstage bulkhead, can be fabricated by any conventional method, e.g. forward/backward extrusion for aluminum alloys, forged and machined for steel alloys, or filament wound from glass or Kevlar (a trademark for an aromatic polyamide fiber material) composites. Any of the above methods will permit a difference in the wall thickness between the first and second stage to minimize the weight of the casing when the stages are operated at different pressures. After fabricating, the casing is proof tested without the interstage port closure to the proof pressure of the second stage chamber. The port closure is then adhesively bonded in place and the retaining ring is threaded into place. The first stage chamber is proof tested to its appropriate level. This test also ensures the tightness of the port cover bond.

The two chambers are then lined with insulant and the solid propellant is pour-cast, the first stage from the nozzle-end and the second stage from the fore-end. After the propellant is cured, the nozzle, with the first stage igniter, and the fore-end closure plate, with the second stage igniter are attached. The motor is then ready for use.

In operation, combustion of the first stage is initiated by the igniter in the nozzle throat. The igniter is ejected and the propellant grain burns radially until it is entirely consumed, the combustion terminating simultaneously and abruptly over the entire forward toroidal surface of the chamber.

At a specified time (either preselected prior to the missile's launch or as determined by the missile's guidance unit), the igniter in the second stage is fired. This shatters the port closure in the interstage bulkhead and ignites the second stage's propellant grain. The combustion gases from the second stage flow subsonically through the port in the bulkhead, into the first stage chamber, through the sonic throat in the nozzle and expand supersonically in the exit cone of the nozzle.

THE EMBODIMENTS OF THE INVENTION IN WHICH AN EXCLUSIVE PROPERTY OR PRIVILEGE IS CLAIMED ARE DEFINED AS FOLLOWS:

1. A solid propellant rocket motor, capable of providing two separate interrupted propulsive impulses to a missile, comprising:
   a cylindrical open-end casing, one end of which is to be connected to the missile body, the other end including an exhaust nozzle having a single centrally located opening;
   a first stage combustion chamber adjacent the aft-end of said casing;
   a first stage igniter and solid propellant composition disposed in said first stage combustion chamber;
   a second stage combustion chamber adjacent the fore-end of said casing;
   a second stage igniter and solid propellant composition disposed in said second stage combustion chamber;
   interstage bulkhead means separating said first and second combustion chambers;
   central port means provided in said bulkhead to connect said first and second combustion chambers; and
   port closure means, wherein the area of the port opening is greater than the smallest area of the nozzle opening to ensure sub-sonic flow of combustion gases from said second combustion chamber and wherein said port closure means is dome shaped with a convex surface facing said first stage combustion chamber and a concave surface facing said second stage combustion chamber, said port closure means having a compressive-to-tensile strength ratio of about 3:1 to withstand compressive combustion pressures applied forwardly during the firing of the first stage, and is made of a suitable frangible material which will break up into harmless fragments under tensile combustion pressures exerted rearwardly during the firing of the second stage.

2. A rocket motor according to claim 1, wherein said exhaust nozzle is of a single opening conical configuration.

3. A rocket motor according to claim 2, wherein said central port means is circular and wherein the diameter of said circular port opening is greater than the smallest diameter of said nozzle opening.

4. A rocket motor according to claim 1, wherein the bulkhead means is integral with said casing.

5. A rocket motor according to claim 1, wherein said bulkhead means includes a groove which provides a bearing surface for receiving an annular nub about the periphery of the port closure, so that when combustion pressure is applied forwardly against the port closure, the port closure is in compression, and wherein a steel locking ring is provided in said first combustion chamber between the port closure and the first combustion chamber casing to prevent the port closure from blowing off when combustion pressure is applied rearwardly against said port closure.

6. A rocket motor according to claim 5, wherein said solid propellant composition disposed in each of said first and second stage combustion chambers is in the form of a cylindrical web about the circumference of the casing to define a central longitudinal perforation in said propellant 7. A rocket motor according to claim 6, wherein the longitudinal perforation in said first stage combustion chamber includes a plug of said solid propellant adjacent to the bulkhead means, the propellant plug thickness being substantially equal to the propellant web thickness to ensure substantially simultaneous consumption of all propellant in said first combustion chamber.

8. A rocket motor according to claim 5, wherein the solid propellant is of a radial burning type.

9. A rocket motor according to claim 1, wherein said port closure means is of a ceramic material 10. A rocket motor according to claim 1, wherein the missile is an air-launched rocket vehicle.

* * * * *